United States Patent [19]

Djeu et al.

[11] 3,992,683
[45] Nov. 16, 1976

[54] OPTICALLY PUMPED COLLISION LASER IN HG AT 546.1 NM

[75] Inventors: Nicholas I. Djeu, Bethesda, Md.; Ralph L. Burnham, Washington, D.C.

[73] Assignee: The United States of America as represented by the Secretary of the Navy, Washington, D.C.

[22] Filed: May 28, 1975

[21] Appl. No.: 581,594

[52] U.S. Cl. ............... 331/94.5 G; 331/94.5 P; 330/4.3
[51] Int. Cl.² ............... H01S 3/22; H01S 3/093
[58] Field of Search ............... 331/94.5 P, 94.5 PE, 331/94.5 G, 94.5 R; 330/4.3

[56] References Cited
UNITED STATES PATENTS

| | | | |
|---|---|---|---|
| 3,317,778 | 5/1967 | Timmermans et al. | 313/225 |
| 3,434,072 | 3/1969 | Birnbaum | 331/94.5 G |
| 3,562,662 | 2/1971 | Gould et al. | 331/94.5 G |

OTHER PUBLICATIONS

Klement'ev et al., J. of Applied Spectroscopy, vol. 18, pp. 29–32, Jan. 1973.
Djeu et al., Applied Physics Letters, vol. 25, No. 6, Sept. 15, 1974, pp. 350–351.

*Primary Examiner*—Robert J. Webster
*Attorney, Agent, or Firm*—R. S. Sciascia; Philip Schneider; Melvin L. Crane

[57] ABSTRACT

A laser cavity containing a mixture of nitrogen, $N_2$, and mercury, Hg, gas is optically pumped by a lamp containing mercury to produce a laser output of 546.1 nm. The upper laser level is excited through optical pumping by a resonance lamp while the lower level which is a low lying metastable state is depopulated by collisional quenching.

4 Claims, 3 Drawing Figures

3,992,683

OPTICALLY PUMPED COLLISION LASER IN HG AT 546.1 NM

BACKGROUND OF THE INVENTION

This invention relates to an optically pumped continuous wave (C.W.) gas laser and more particularly to optically pumping Hg—$N_2$ with a resonance lamp containing Hg therein in order to produce a laser output of 546.1 nm.

Heretofore all known C.W. visible gas laser systems have been excited by an electrical discharge. In such laser systems, an electric discharge produces a plasma in the gas which serves as the active laser medium. In order to establish a population inversion in such C.W. gas laser systems, the lower laser level must be quenched at a rapid rate. The atomic levels closest to the ground state cannot do so radiatively either because of metastability or because of radiation trapping. Consequently, all known previous C.W. visible gas lasers have utilized very high lying energy levels for the laser transition which is responsible for the low efficiency of such systems. In order to produce laser systems operating on low lying energy levels, thereby producing high quantum efficiency, one must resort to quenching the lower laser level through collisions of the second kind. However, for the latter to be effective, the pressure of the quenching gas generally would have to be much greater than the pressure of the active atomic species. This condition poses two problems for the practical application of collisional quenching in electric discharge systems. First, the large concentration of the quenching gas will absorb much of the electron energy in the discharge, leaving little for the excitation of the active species. Furthermore, the high total pressure of the system may actually prevent the gas from breaking down to become a glow discharge. For the above reasons, it is generally believed that the C.W. visible lasers with electric discharge excitation will not produce a high efficiency output.

A system such as set forth above has been described in "Mercury-Vapor Lasers", by V.M. Klement'ev and M.V. Solov'ev, *Journal of Applied Spectroscopy*, Vol. 18, pp. 29–37, January 1973.

SUMMARY OF THE INVENTION

This invention is directed to a Hg—$N_2$ gas laser system which combines optical pumping by a resonance lamp with the collisional quenching of the lower laser level which is a low-lying metastable state. The physical separation of the excitation source from the laser medium allows one to use large amounts of a quenching gas such as nitrogen to depopulate the lower laser level without interfering with the pumping process. The laser cavity contains Hg at a pressure of a few millitorr and $N_2$ quenching gas at a pressure of from 10 to 120 Torr. The laser system may be pumped by a toroidal Hg lamp coaxial with the laser tube and radio frequency excited through magnetic induction. In a second geometry a linear Hg lamp may be used to pump the laser in a cylindrical elliptical cavity. Each lamp contains Hg vapor at a pressure of a few millitorr.

DETAILED DESCRIPTION

Figure 1:
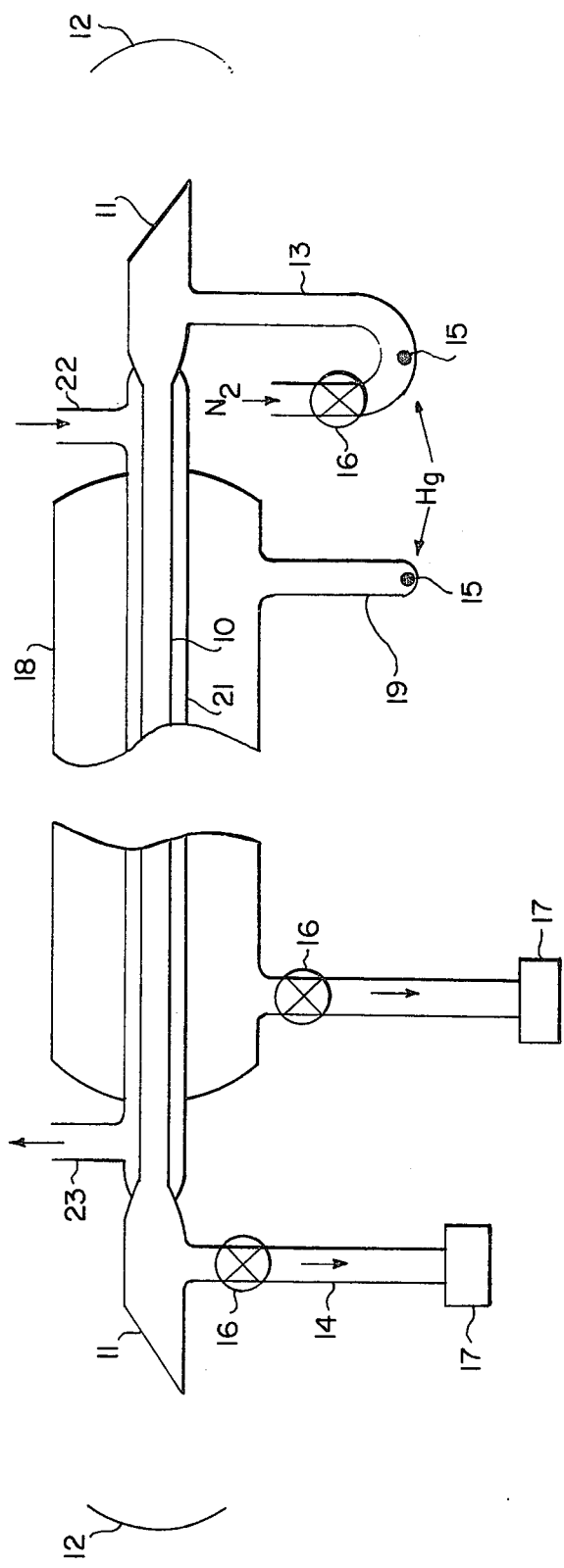
FIG. 1 is a cross-sectional view of the device illustrating the relative parts.

The laser cavity includes a fused silica cylinder 10 3 mm diameter and 30 cm in length terminating in Brewster's windows 11 made of quartz. Two 1-meter radius of curvature 0.1% transmitting mirrors 12 are positioned opposite the ends of the tubular member. The tubular member 10 contains mercury vapor at a pressure of a few millitorr (from about 1 to 10 millitorr) and a quenching $N_2$ gas at a pressure of from 10–120 Torr. The lower limit on the $N_2$ pressure of 10 Torr is determined by the quenching rates for the upper and lower laser levels. It has been determined that the laser will not operate for a $N_2$ pressure less than 10 Torr regardless of the pump intensity at 253.1 nm and 404.7 nm. The cylinder may be provided with side arms 13 and 14 for varying the $N_2$ pressure. Side arm 13 through which nitrogen is admitted includes a U-shape band within which about 20 mg of mercury 15 is dropped. The admittance of nitrogen is controlled by valve 16 and arm 14 which is connected to a vacuum pump 17. The laser cavity is pumped by a 35 mm diameter electrodeless toroidal Hg lamp 18 coaxial with the laser cylinder and having a sidearm 19 with a drop of mercury 15 therein. The lamp is radio frequency excited through magnetic induction and operated at 20 MHz. The lamp is connected with a vacuum pump 17 and controlled by valve 16. Each cylinder and pump lamp contains isotopic $Hg^{200}$ of 89.9% purity at a pressure of a few millitorr as determined by the room termperature. A 7 mm diameter intermediate fused silica tube 21 coaxial with the cylindrical laser element and lamp is provided for simultaneously water cooling the lamp and laser element. The water cooling tube 21 is provided with inlet 22 and outlet 23 through which the water flows. The operation of the laser element and energy transitions thereon will be set forth later. The lamp and laser cylinder may be made without side arms with the drop of mercury placed within the chamber.

The device has been shown with a toroidal Hg lamp coaxial with the laser cylinder. The gases within the laser cylinder may also be excited by a linear Hg lamp which parallels the axis of the cylinder. In each case, the lamps contain isotopic $Hg^{200}$ of about 89.9% purity and at a pressure of a few millitorr.

The laser cavity is constructed as shown, evacuated, and the Hg and $N_2$ gases added to the proper pressures. The provision for flowing the nitrogen is only made to facilitate changing its pressure as desired. The flow is not necessary for the operation of the laser. The lamp is radio frequency excited through magnetic induction to provide a continuous light source which excites the gases within the laser cylinder. Laser oscillation begins at a $N_2$ pressure of 10 Torr and continues up to a $N_2$ pressure of 120 Torr.

Figure 2:
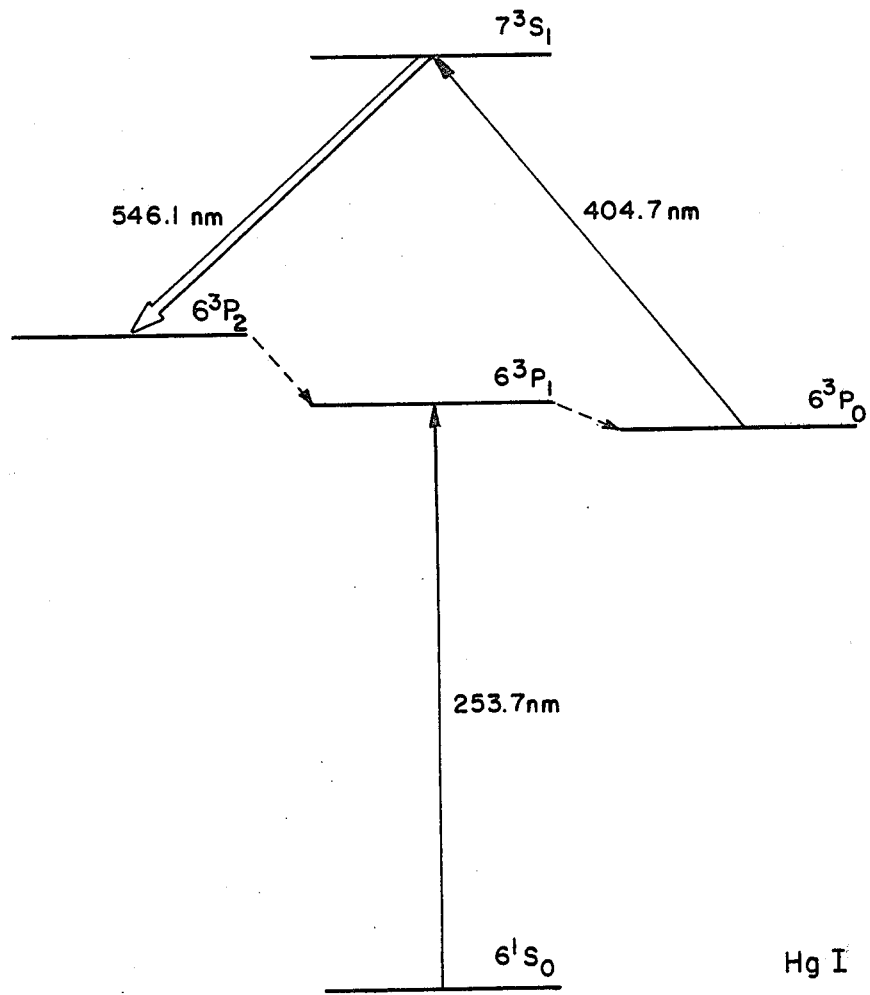
FIG. 2 illustrates the energy levels of the laser system.

Fig. 2 illustrates the relevant energy levels of Hg I and the excitation scheme pertinent to the Hg—$N_2$ laser. The operation is thus explained. Mercury atoms in the ground $6^1S_0$ level absorb photons at 253.7 nm to populate the $6^3P_1$ level, are collisionally deactivated by $N_2$ to the $6^3P_0$ level, and accumulate there due to the latter state's long lifetime. Absorption of a second photon at 404.7 nm takes the atom from the $6^3P_0$ state to the upper laser level $7^3S_1$. After undergoing stimulated emission at 546.1 nm, the atom is quenched out of the lower laser level $6^3P_2$, again through collisions with $N_2$.

As illustrated, a dashed line is drawn from $6^3P_2$ only to $6^3P_1$, although the distribution of final states of Hg from the last process is not completely understood. Also, there is the possibility of optical pumping of the upper laser level by absorption of 435.8 nm photon from $6^3P_1$. This is considered a minor process in the present device because the $6^3P_1$ level has a much smaller density compared to $6^3P_0$.

Figure 3:
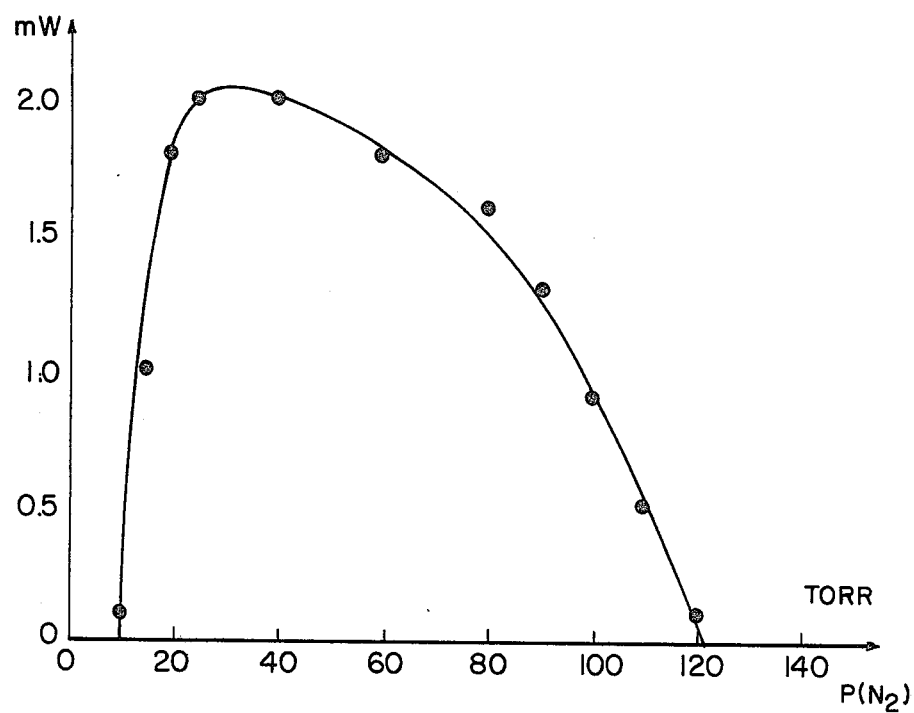
FIG. 3 is a graph illustrating the laser output power from one mirror as a function of nitrogen pressure.

FIG. 3 illustrates the laser output power from one of the mirrors as a function of $N_2$ pressure. As shown, laser oscillation begins at $N_2$ pressure of 10 Torr, rises very sharply before reaching a maximum at about 25 Torr. At higher $N_2$ pressures, the small-signal gain diminishes, while the saturation parameter increases, resulting in a slow fall in power output. Probing with a C.W. dye laser shows a peak gain of 3% per pass at a $N_2$ pressure of 25 Torr. The data in FIG. 3 were taken with a 1–$K$W electrical input into the lamp. It is estimated that the lamp produced radiation at 253.7 and 404.7 nm with $\sim$ 10% and $\sim$ 0.1% efficiency, respectively. Most of the light at 253.7 nm is wasted, and approximately one third of the light at 404.7 nm is effective in pumping the upper laser level in the described arrangement. Only a small fraction of the latter is converted to laser output, since the mirror transmission is probably an order of magnitude smaller than scattering losses in the windows and mirror coatings. Assuming that output coupling constitutes the only form of cavity loss, a simple rate equation analysis shows that the power output in photons per second is given by $$P_{out} = \frac{[R_1 - (g_u/g_1)(A_{u1} + R_{u1})](1-f)}{R_1 + (g_u/g_1)(A'_u + R'_u)} P_{in},$$

where $A_{u1}$ and $R_{u1}$ are the radiative transition probability and collisional quenching rate by $N_2$ of the upper laser level into the lower laser level, $A'_u$ and $R'_u$ are the corresponding rates from the upper laser level to all other levels, and $R_1$ is the total collisional quenching rate of the lower laser level by $N_2$. The parameter $f$ is the ratio of the laser saturated gain coefficient to the small-signal gain coefficient (assuming the transition is pressure broadened), and $g_u$ and $g_1$ are the degeneracies of the upper and lower laser levels. Finally, $P_{in}$ is the rate of pumping of the upper laser level by 404.7 nm radiation in photons per second.

For $7^3S_1$ and $6^3P_2$ levels of Hg, $g_u = 3$, $g_1 = 5$, $A_{u1} = 4.5 \times 10^7$ sec$^{-1}$, and $A'_u = 5.8 \times 10^7$ sec$^{-1}$. The total quenching coefficient of $7^3S_1$ by $N_2$, $(R'_u + R_{u1})/P(N_2)$, has been measured to be $4.3 \times 10^6$ sec$^{-1}$ Torr$^{-1}$. It has also been determined that $R_1/P(N_2) = 2.7 \times 10^6$ sec$^{-1}$ Torr$^{-1}$ and $R_{u1}/P(N_2) < 0.5 \times 10^6$ sec$^{-1}$ Torr$^{-1}$. For a reasonable amount of output coupling, $f << 1$. At a $N_2$ pressure of 100 Torr then, one calculates $P_{out} = 0.40$ $P_{in}$. Thus about half the photons absorbed at 404.7 nm by the laser medium should reappear as stimulated output in a properly scaled $N_2$–Hg laser.

It is not known how much light at 253.7 nm must be supplied in order to maintain a $6^3P_o$ density high enough to make the laser medium optically thick to 404.7 nm. With the pumping intensities at 253.7 and 404.7 nm in the present device, it is believed that the major loss mechanism out of the triplet loop is the reradiation of 253.7 nm light by $6^3P_1$ at a rate of $\sim 10^{18}$ sec$^{-1}$ cm$^{-3}$. At higher 404.7 nm pump rates, a larger flux of 253.7 nm photons may be required if there is substantial quenching at the $7^3S_1$ or the $6^3P_2$ level directly to the ground $6^1S_o$ state by $N_2$. However, at present the 253.7 nm line can be produced with $\sim$ 10% efficiency (in low pressure Hg lamps such as the one used), whereas the 404.7 nm line has only $\sim$ 1% efficiency (in higher pressure Hg-lamps). Therefore, it is believed that the over-all $N_2$–Hg laser efficiency will be determined largely by the efficiency for the production of 404.7 nm radiation.

Optical pumping of a gas laser as set forth above utilizes low lying energy levels for the laser transition and collisional quenching of the lower laser level to produce a laser output.

The light source set forth above produces an output at 253.7 nm and also at 404.7 nm. For an optimal output in the described laser system two different light sources should be used, one operating at 253.7 nm and the other at 404.7 nm. The above described lamp is a low pressure lamp which produces radiation of 253.7 nm with about 10% efficiency and 404.7 nm radiation with about 0.1% efficiency. Higher pressure Hg lamps would yield light at 404.7 nm with an efficiency of a much higher % efficiency.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A continuous-wave, optically pumped, electronic-state, collision laser which comprises:
    means for containing a gaseous mixture;
    said gaseous mixture including atoms of mercury and a quenching gas of nitrogen;
    an optical pump lamp in optical pumping relationship with respect to said containing means for creating a population inversion between certain energy levels of said atoms; and
    means optically coupled to said gaseous mixture for stimulating the emission of a laser beam from the inverted atoms on the 546.1 nm transition of atomic mercury.

2. A laser as claimed in claim 1; wherein, said mercury has a partial pressure of a few millitorr and said nitrogen has a partial pressure of from 10 to 120 Torr.

3. A laser as claimed in claim 1; wherein, said pump lamp surrounds said containing means in coaxial alignment, and contains mercury vapor at a pressure of a few millitorr.

4. A laser as claimed in claim 3; which includes, a tubular member surrounding said containing means between said containing means and said flash lamp coaxial therewith through which a coolant flows for cooling said lamp and said containing means.

* * * * *